2,913,108
SHEAR-OFF ARTICLE SIZING MECHANISM AND METHOD

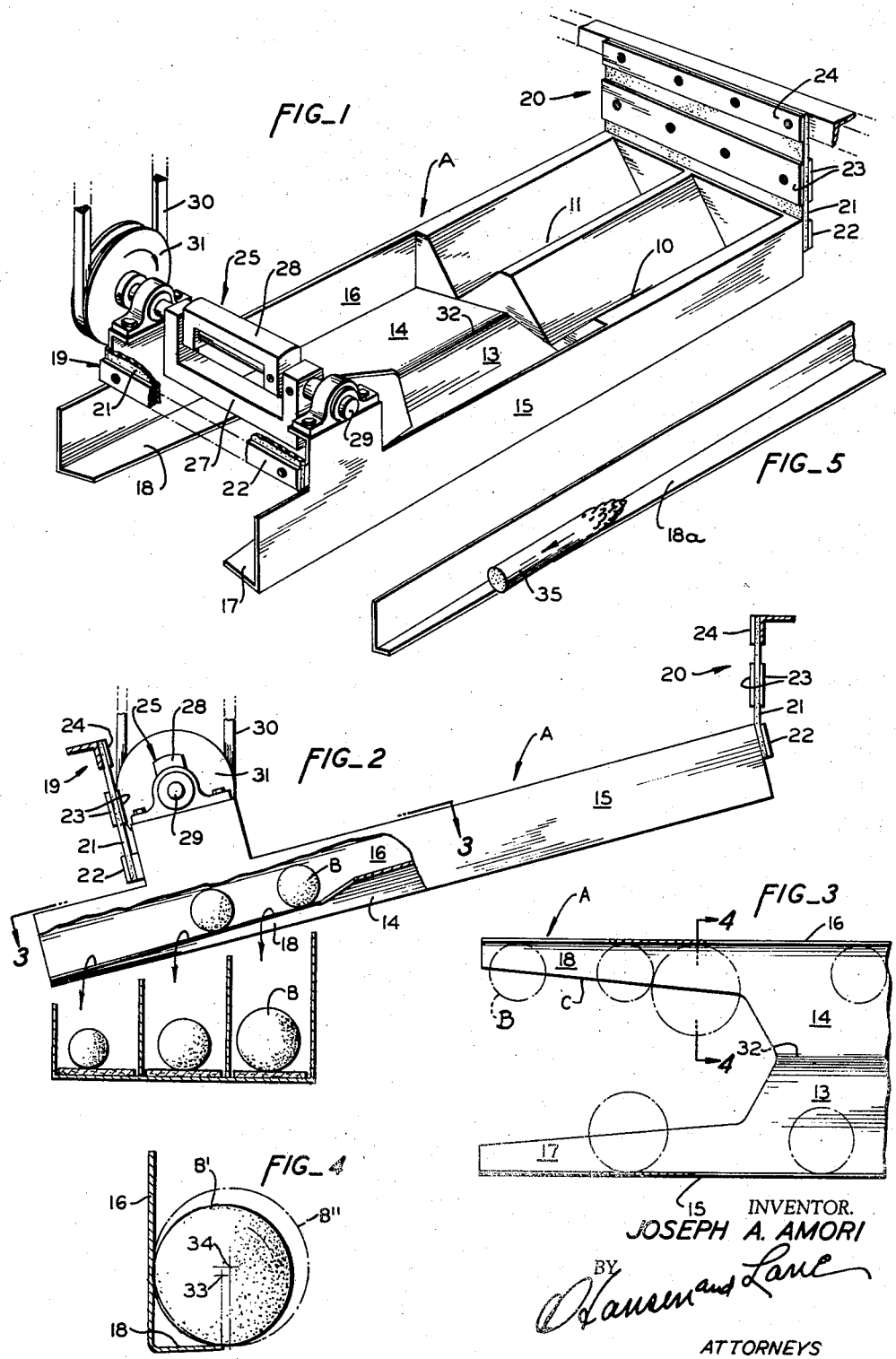

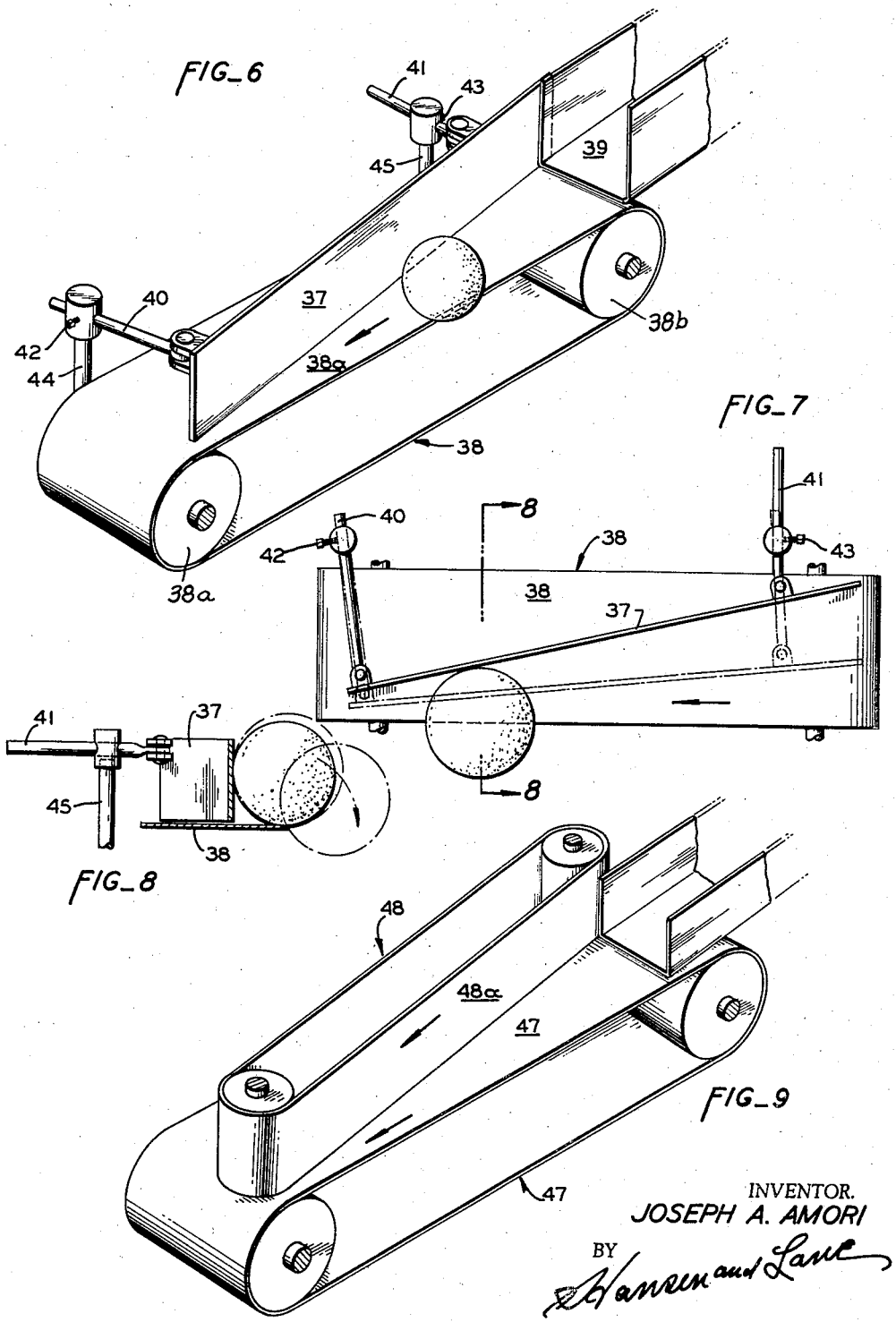

Joseph A. Amori, San Jose, Calif.

Application January 7, 1957, Serial No. 632,715

2 Claims. (Cl. 209—72)

The present invention relates to article sizing, and pertains more particularly to a machine for sizing fruits, vegetables and other articles.

In the past, it has been common practice when separating fruits and vegetables into groups according to their size, to employ a shaker table or other device having openings therein of predetermined size to pass fruit of desired dimensions therethrough. Such sizing mechanisms work satisfactorily on hard, regularly shaped fruit, such as green pears and apples, but is apt to bruise or damage softer fruit or vegetables such as fully ripe fruit, or fruit of the more delicate varieties which are easily damaged by bruising.

Also, as is well known, such prior art machines have not been satisfactory for grading substantially elongated articles, such as, for example, asparagus.

The present invention contemplates the provision of an improved and simplified sizer for fruits, vegetables and other articles.

A further object of the invention is to size fruits, vegetables and other articles by feeding them single file onto an elongated, tapering shelf mounted alongside an upright shear-off wall, an initial portion of the shelf having an effective horizontal width greater than half the diameter of the largest article to be retained for sizing thereon, and tapering to an effective horizontal width at its take-off end of less than half the diameter of the smallest article to be sized by toppling laterally therefrom.

The invention also provides for sizing articles by feeding them in single file onto an elongated, tapering shelf.

The invention also provides a shaker table having means at its intake end for aligning articles to be sized into single file therein, and for discharging these articles in single file onto a tapered shelf which slopes downwardly from a free lateral edge thereof toward a guiding upright shear-off wall mounted alongside thereof, and which tapers from a width at its receiving end of approximately one half the diameter of a maximum size article to be sized thereon, to a width at its discharge end of less than one half the diameter of a minimum size article to be sized thereon.

A further object of the invention is to provide an improved and simplified sizing mechanism.

These, and other objects and advantages of the invention, will be apparent from the following description and the accompanying drawings, wherein Fig. 1 is a fragmentary perspective view showing the invention embodied in the shaker unit of a shaker table, portions being broken away.

Fig. 2 is a side elevational view of the shaker table elements shown in Fig. 1 compartments for receiving fruit of different sizes being shown sectionally therebeneath.

Fig. 3 is a fragmentary sectional view taken along line 3—3 of Fig. 2.

Fig. 4 is an enlarged, fragmentary, sectional view taken along line 4—4 of Fig. 3.

Fig. 5 shows a fragment of one discharge end portion of an elongated sizing shelf for sizing asparagus or other elongated product.

Fig. 6 is a fragmentary perspectve view showing a modified form of the invention with a portion of a feed chute arranged for feeding articles in single file to the sizer.

Fig. 7 is a plan view of Fig. 6, the feed chute being omitted, and the shear-off wall being shown in solid lines in one adjusted position, and in broken lines in another adjusted position.

Fig. 8 is a sectional view taken along line 8—8 of Fig. 7.

Fig. 9 is a fragmentary perspective view showing a sizer of the general nature of Fig. 6 but with the shear-off wall also in the form of a belt.

Briefly, the invention comprises article aligning means, such as grooves 10 and 11 in the right-hand portion of the shaker unit A (Fig. 1) of an otherwise conventional shaker table (not shown) for feeding in single file fruit, vegetables or other articles to be sized onto a pair of outwardly sloping side plate portions 13 and 14. Upright side walls 15 and 16 limit outward movement of the articles on the sloping plate portions 13 and 14, and are co-extensive with a pair of tapered sizing shelves 17 and 18 which are contiguous with the sloping side plate portions 13 and 14.

The sizing shelves 17 and 18 taper from a maximum width at their right hand or intake ends of greater than half the diameter of the largest articles to be retained thereon for sizing, to a minimum width at their left-hand or discharge ends of slightly less than half the diameter of the smallest articles to be sized by topping laterally therefrom. Of course, articles having a diameter less than twice the width of the narrow ends of the shelves will not be sheared laterally therefrom, but instead will be discharged from the left-hand ends of the shelves (Fig. 1).

Referring to the drawings in detail, the shaker unit A is mounted for longitudinal oscillating motion by means of a pair of similar suspension members 19 and 20, each of which comprises a flexible support member 21 such as a strip of rubber belting, braced by battens 22, 23 and 24 so that its flexing action is limited to narrow portions thereof above and below the central stiffening battens 23.

Oscillating motion is imparted to the shaker table by means of oscillating means 25 comprising a pair of weights 27 and 28, secured in relative rotatively adjusted position to a shaft 29, which is rotatively driven from a suitable source of power (not shown) by means of a drive belt 30 and grooved pulley 31. Article aligning grooves 10 and 11 at the right-hand or intake end of the table A, by gravity and the action of the shaker table, cause articles fed therein to form into single file along the bottoms of the grooves in a well known manner. Below, or to the left of the grooves 10 and 11, the side plate portions 13 and 14, which may be of sheet metal, slope outwardly on both sides of a center ridge 32 so that articles discharged in single file from the lower or left-hand ends of the grooves 10 and 11 will gravitate laterally outwardly until they encounter the upright side walls 15 and 16.

The sloping plate portions 13 and 14 are of a length to insure that articles discharged thereon, such as, for example, peaches B (Figs. 2 and 3) reach the side walls 15 and 16. A notch C (Fig. 3) forms the pair of tapered shelf portions 17 and 18 which, as shown in Figs. 1–3, are contiguous with the plate portions 13 and 14, respectively, and preferably slope outwardly toward the side walls 15 and 16.

As long as the center of gravity of an article, such as a fruit B, advancing along a shelf 17 or 18 remains over the shelf, as illustrated by the smaller article B' and its center of gravity 33 in Fig. 4, the article will be retained in a state of equilibrium on the shelf. However, when the shelf narrows sufficiently to cause the center of gravity of the article to pass beyond the free edge of the shelf, then the article topples off the shelf as shown by the larger article B" and its center of gravity 34.

In grading elongated articles such as the spear of asparagus 35 (Fig. 5) the sizing shelf 17a preferably is substantially elongated, and suitable feed means (not shown) are provided for feeding the articles to be graded onto the shelf in single file. Such feed means are too well known to those familiar with the art to require a description herein.

In the modified form of the invention shown in Figs. 6, 7 and 8, an adjustable shear-off wall 37 is provided in conjunction with a shelf consisting of the upper run of a conveyor belt 38, which receives the articles to be sized in single file from suitable feed means (not shown) through a feed chute 39.

The belt 38 is passed around end rollers 38a and 38b and is driven by suitable well known drive means to move its upper run in the direction of the arrow thereon. The shear-off wall 37 is supported by a pair of laterally extending support rods 40 and 41 hingedly connected to the wall 37 and secured in longitudinally adjusted position by set screws 42 and 43 in standards 44 and 45 mounted alongside the belt 38. The wall 37 may be adjusted to a desired position diagonally of the belt 38 as illustrated in Fig. 7 to provide a selected tapered shear-off action depending upon the desired sizes of the articles to be graded.

At times it may be desirable either to increase or decrease relative frictional movement between the articles being graded by the shear-off wall. For example, with a very delicate or possibly freshly treated article it may be desirable to avoid any frictional movement between the articles and the wall. In such cases, the articles may be advanced on a conveyor belt 47 (Fig. 9) and the shear-off wall may be in the form of a second upright belt 48 mounted diagonally thereof with the inner run 48a of the latter belt driven to advance at the same speed as the articles on the lower belt 47.

On the other hand, it might be desirable to have the articles subjected to additional relative frictional movement by the shear-off wall as they pass along the supporting belt 47. In such case, the shear-off belt 48 may be driven to have its inner run 48a advance at a different speed from that of the lower belt 47, or if desired, to run in the opposite direction from the supporting belt 47. Any of these conditions may easily be provided by controlling the speed and direction of the inner run 48a of the shear-off belt 48 relative to the supporting belt 47.

The present invention comprises a simple, rapid and positive sizing mechanism for use on many different types of fruit, vegetables and other articles, and one which causes a minimum amount of bruising of the articles being graded.

While I have illustrated and described a preferred embodiment of the present invention, and one modified form thereof, it will be understood however, that other changes and modifications may be made in the details thereof without departing from the scope of the invention as set forth in the appended claims.

Having thus described the invention, what I claim as new and desire to protect by Letters Patent is defined in the following claims.

I claim:

1. A sizer for fruit, vegetables and other articles comprising a shaker unit of a shaker table, said shaker unit comprising an upper portion and a lower portion, a pair of troughs, one along each side of the upper portion of the shaker unit for arranging articles fed therein into single file, a side wall along each side of the lower portion of the shaker unit, a tapered support shelf with its wider end positioned in longitudinal alignment with each trough to receive articles in single file therefrom, and extending laterally from a lower portion of each side wall and sloping downwardly slightly toward the wall to retain articles for sizing on the shelf, whereby the articles are advanced by the action of the shaker table in single file from each trough onto the wider end of each tapered shelf into contact with its associated wall, and thence along the shelf toward its narrower end, the wider end of each shelf being more than half the width of the largest article to be retained for sizing thereon, and the narrower end of each shelf being less than half the width of the smallest article to be sized by being toppled laterally from the shelf, whereby each article passing along the shelf will have its center of gravity moved laterally beyond the free edge of its supporting shelf, and will topple therefrom at a point along the shelf where the horizontal width of the shelf from the shear-off wall becomes less than one half the width of an article to be segregated at that point.

2. A sizer for fruit, vegetables and other articles comprising a shaker unit of a shaker table, said shaker unit comprising an upper portion and a lower portion, means on the upper portion of the shaker unit for arranging articles fed therein into single file, a side wall along the lower portion of the shaker unit, a tapered support shelf with its wider end positioned to receive articles in single file from the upper portion of the shaker unit and extending laterally from a lower portion of said side wall and sloping downwardly slightly toward the wall to retain articles for sizing on the shelf, whereby the articles are advanced by the action of the shaker table in single file onto the wider end of the tapered shelf in contact with the wall, and thence along the shelf toward its narrower end, the wider end of the shelf being more than half the width of the largest article to be retained for sizing thereon, and the narrower end of the shelf being less than half the width of the smallest article to be sized by being toppled laterally from the shelf, whereby each article passing along the shelf will have its center of gravity moved laterally beyond the free edge of the shelf and will topple therefrom at a point along the shelf where the horizontal width of the shelf from the side wall becomes less than one half the width of an article to be segregated at that point.

References Cited in the file of this patent

UNITED STATES PATENTS

| | | |
|---|---|---|
| 909,413 | Huntley | Jan. 12, 1909 |
| 1,661,503 | Rogers | Mar. 6, 1928 |
| 2,549,316 | Kremer et al. | Apr. 17, 1951 |

FOREIGN PATENTS

| | | |
|---|---|---|
| 592,573 | France | May 2, 1925 |
| 974,980 | France | Oct. 4, 1950 |
| 530,795 | Great Britain | Dec. 20, 1940 |